C. KOHLER.
STEAM TURBINE DRIVEN VEHICLE.
APPLICATION FILED DEC. 22, 1919.
1,349,282. Patented Aug. 10, 1920.
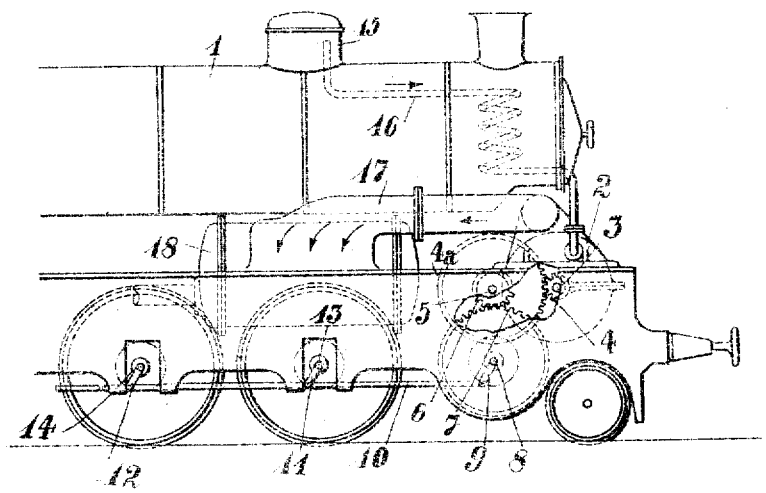
*Inventor:*
Conrad Kohler,
By Henry Dott
Atty.

UNITED STATES PATENT OFFICE.

CONRAD KOHLER, OF ZURICH, SWITZERLAND.

STEAM-TURBINE-DRIVEN VEHICLE.

1,349,282.   Specification of Letters Patent.   Patented Aug. 10, 1920.

Application filed December 22, 1919. Serial No. 346,695.

*To all whom it may concern:*

Be it known that I, CONRAD KOHLER, a subject of the Republic of Switzerland, residing at Hardturmstrasse 19, Zurich, Switzerland, have invented certain new and useful Improvements in Steam-Turbine-Driven Vehicles; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The invention relates to steam-turbine driven vehicles, in which the steam-turbine transmits its power in a manner well known with electrical drives by means of a double spur-gearing to a blind shaft, and the latter transmits the power by means of a crank gear to at least one driving axle. With this arrangement steam-turbine and transmission gear may for the most part be placed below the boiler.

With the heretofore known steam-turbine driven vehicles the turbine transmitted its power either directly by means of bevel-wheels onto the driving-axle, or by means of bevel-wheels to a longitudinally arranged shaft and from the latter again by means of bevel-wheels to a driving-axle. This transmission of power has the great disadvantage that bevel-wheels are not suited for transmitting large powers when running at high speeds. Further it is difficult to construct bevel wheels which engage well. They produce great noise, are subjected to much wear and cause a considerable axial thrust. These disadvantages are overcome by the present invention. It is not with vehicles driven by electro-motors, to arrange the latter transversely to the direction of running and to cause them to drive by means of spur-gearing onto the driving-axles.

These machines, however, are no power producing engines, they are dependent on a stationary primary power station and on a transmission line. In opposition to that arrangement, the required working-power may be produced on the steam-locomotive proper and in spite of certain advantages of the electric drive, the constructors have invariably fallen back on the steam-drive, endeavoring to increase the economy in adopting steam-turbines, which may be worked condensing, i. e. exhausts into a condenser. In spite of the fact of transmission by electro-motor onto a driving-axle being known, the object of this invention has up to now not been attained, but the bevel-gearing has been considered as the only means of transmission. The carrying into effect of this invention allows of running the turbine at a very high speed. Hereby the runner-blading is subjected to a favorable circumferential speed while keeping the desired small diameters and a suitable ratio between the steam and the circumferential velocities is attained. The turbine may be of such a small size that it may be arranged below the boiler and the whole transmission gearing consisting of a double spur-gearing, a blind shaft and connecting rods, while taking up little space, may be constructed in a simple and yet thoroughly reliable manner.

The accompanying drawing illustrates by way of example a steam-turbine driven locomotive.

Below the front end of a steam-boiler 1 a turbine 2 is arranged, the shaft of which is transverse to the direction of running. On the shaft 3 a first driving pinion 4 is mounted, which is in mesh with a large wheel 4' mounted on the countershaft 5. The latter drives by means of a second spur-wheel gearing 6 and 7 the blind shaft 8. Said blind shaft transmits the power by means of a crank 9 onto a connecting rod 10, which in its turn drives by means of cranks 11 and 12 the driving axles 13 and 14. The turbine 2 is supplied with steam from the steam dome 15 through a conduit 16. The exhaust steam of the turbine passes through a pipe 17 to a surface condenser 8, also placed below the boiler 1.

As is shown on the drawing, not only the steam turbine 2, but also the whole transmission gearing is for the most part arranged below the boiler, thus insuring the whole locomotive to be constructed as short as possible.

What I now claim is:

1. In a steam-turbine driven vehicle, a transmission gear comprising two spur-gear systems, a blind shaft and a crank-gear, said transmission gear interposed between and adapted to connect operatively the turbine and the driving axles of the vehicle.

2. A steam-turbine driven vehicle, comprising a turbine, a blind shaft, two spur-gear systems operatively connecting the turbine and the blind shaft, and crank gear operatively connecting the blind shaft and the driving axles of the vehicle.

3. A steam-turbine driven vehicle, comprising a turbine and a transmission gear for transmitting the power of the turbine to the driving axles consisting of two spur-gear systems, a blind-shaft and crank gear, the steam-turbine and the transmission gear being for the most part arranged below the boiler.

4. A steam turbine driven vehicle comprising a boiler, a turbine supplied from said boiler and a surface condenser into which said turbine discharges, a blind shaft, transmission spur gearing between said turbine and blind shaft and a crank mechanism operated by said blind shaft for actuating the several driving wheels of the vehicle.

In testimony that I claim the foregoing as my invention I have signed my name.

CONRAD KOHLER.